United States Patent [19]
Regener

[11] Patent Number: 5,194,917
[45] Date of Patent: Mar. 16, 1993

[54] FIBER-OPTIC GYROSCOPE INTEGRATED ON A SILICON SUBSTRATE

[75] Inventor: Rolf Regener, Schorndorf, Fed. Rep. of Germany

[73] Assignee: Standard Elektrik Lorenz Aktiengesellschaft, Stuttgart, Fed. Rep. of Germany

[21] Appl. No.: 734,145

[22] Filed: Jul. 22, 1991

[30] Foreign Application Priority Data

Aug. 27, 1990 [DE] Fed. Rep. of Germany ......................... 4027024006

[51] Int. Cl.5 ............................................. G01C 19/72
[52] U.S. Cl. ..................................... 356/350; 385/14
[58] Field of Search .................. 356/350, 345; 385/14; 250/231.1

[56] References Cited

U.S. PATENT DOCUMENTS 4,265,541  5/1981  LeClerc et al. ...................... 356/350
4,653,917  3/1987  Moeller et al. ...................... 356/350
4,890,895  1/1990  Zavracky et al. .

FOREIGN PATENT DOCUMENTS 0092831  11/1983  European Pat. Off. .
0141331  5/1985  European Pat. Off. .

OTHER PUBLICATIONS

"Fiber Optic Rotation Sensor (FORS) Laboratory Performance Evaluation", Goldstein et al., Optical Engineering Jul. 1979, pp. 381–383.

Auch et al., "Fiber Optic Gyroscope: An Advanced Rotation Rate Sensor," Electrical Communication, vol. 61, No. 4, 1987, pp. 372–378.

Minford et al., "Interferometric Fiber Optic Gyroscope Using a Novel 3×3 Integrated Optic Polarizer/Splitter" Optical Fiber Sensors, 1988 Technical Digest Series, New Orleans, La. Jan. 1988, pp. 385–392.

"Halbleiterdiodenlaser mit Wellenleiter under integriertem optischem Glasfasergyroskop," Neues Aud Der Technik, Nr. 3, 15, Sep. 1989, Würzburg, Germany, p. 3.

Wulf-Mathies, "Integrierte Optik für Faseroptische Sensoren," Laser Und Optoelektronik, Band 21, Nr. 1, Feb. 1989, Stuttgart, Germany, pp. 57–63.

Primary Examiner—Samuel A. Turner
Attorney, Agent, or Firm—Spencer, Frank & Schneider

[57] ABSTRACT

A fiber-optic gyroscope for measuring rotation rates which includes electrical, optical, and electro-optical functional units as well as at least one fiber coil, is constructed so that at least the optical and electro-optical functional units are integrated on a single silicon substrate.

19 Claims, 4 Drawing Sheets

FIBER-OPTIC GYROSCOPE INTEGRATED ON A SILICON SUBSTRATE

BACKGROUND OF THE INVENTION

1. Field of the Invention

The present invention relates to a fiber-optic gyroscope for measuring rotation rates, in particular including electrical, optical and electro-optical functional unit.

2. Background Information

A conventional fiber-optic gyroscope for measuring rotation rates is described in the journal "Elektrisches Nachrichtenwesen", Vol. 61, No. 4, 1987, pages 372 to 378. In this fiber-optic gyro, the optical and electro-optical functional units are contained in a housing separated from the electrical functional units. The housing contains essentially a laser module, a detector module, and an integrated optics circuit (IOC) module coupled between the detector module and a fiber coil. In the IOC module, a coupler, a polarizer, a phase modulator, and a beam splitter are integrated on an $LiNbO_3$ substrate.

The manufacturing costs of such a gyro, particularly of the optical portion, are considerable, so that its range of application is greatly limited. To achieve optimum performance characteristics, tight tolerances in the submicron range must be held when coupling the optical waveguides to the laser and detector on the one hand and to the IOC module on the other hand and when coupling the ends of the fiber coil to the IOC module. This requires very time-consuming and expensive adjustment work.

SUMMARY OF THE INVENTION

It is the object of the invention to improve the fiber-optic gyroscope of the above type so that less adjustment work is required during its manufacture and so that it can be mass-produced at lower cost. This object is attained by a fiber-optic gyroscope wherein at least the optical and electro-optical functional units are integrated on a silicon substrate. Further advantageous features of the fiber-optic gyroscope will be described below.

The functional units of the fiber-optic gyroscope, which, according to the invention, are integrated on a single substrate, have the advantage that, at least in a simple embodiment, the need to adjust the source-to-fiber, fiber-to-detector, and fiber-to-IOC-module couplings is eliminated. They are fabricated on a substrate of silicon, which can be produced at very low cost and worked with high precision by well controllable manufacturing techniques. In addition, any individual or all electrical functional units may be integrated on the substrate, which results in a further cost reduction. The substrate, which can be produced with a suitable "mounting pit", permits the use of a light source in the form of a low-cost, commercially available laser chip as is employed in CD players for example.

BRIEF DESCRIPTION OF THE DRAWINGS

The invention will now be explained in more detail with reference to the accompanying drawings, in which.

DETAILED DESCRIPTION OF THE PREFERRED EMBODIMENT(S)

Figure 1:
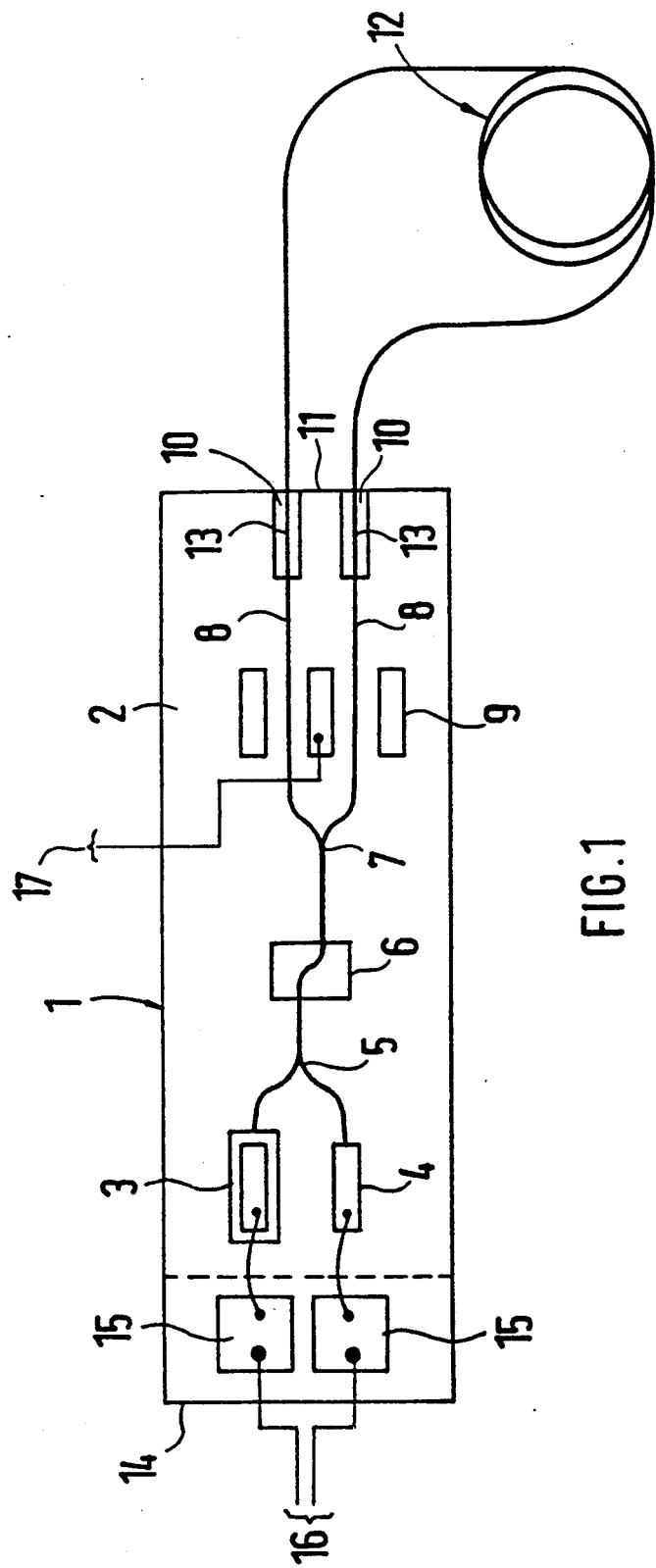
FIG. 1 shows schematically a first embodiment of a large-scale-integrated functional unit according to the invention having a fiber coil coupled thereto.

In FIGS. 1 to 4, the novel large-scale-integrated functional unit of the fiber-optic gyroscope according to the invention is designated 1. It consists of several optical functional units, such as couplers, polarizers and beam splitters, and several electro-optical functional units, such as a light source, detectors, and phase modulators. The base of the large-scale-integrated functional unit 1 is a silicon substrate 2 on which several optical and electro-optical functional units are integrated and interconnected by integrated optical waveguides. In FIG. 1, the individual functional units are a light source 3, e.g., a laser with a short coherence length, a detector 4 beside light source 3, and a preceding coupler 5, which is optically connected to light source 3 and detector 4. The single-guide end of coupler 5 is connected through a polarizer 6 to a beam splitter 7 with a Y-junction. Branches 8 of the junction each run through a modulator 9 and each end at the beginning of a groove 10. The two grooves 10 extend side by side up to an outer edge of the substrate 2. In grooves 10, ends 13 of fiber coil 12 are optically coupled to branches 8 of beam splitter 7 and securely held in place.

In the vicinity of light source 3 and detector 4, preferably between these functional units and an adjacent outer edge 14 of substrate 2, two areas 15 are provided which, in a simple embodiment of large-scale-integrated functional unit 1, are designed as bonding pads for making connections to electro-optical functional units, and to which are connected control lines 16 for the electro-optical functional units, which come from electrical functional units (not shown) of the fiber-optic gyro. In a more complex embodiment of large-scale-integrated functional unit 1, areas 15 contain either circuitry for performing partial functions of the electrical functional units, such as a preamplifier circuit for detector 4 and a drive circuit for laser 3, or all electrical functional units.

To construct the passive functional units on Si, use is made of phosphorus- or germanium-doped $SiO_2$ waveguides, whose modal fields can be well adapted to the waveguide of fiber coil 12, which is a polarization-maintaining glass fiber, and $Si_3N_4$ waveguides, which can be well adapted to the modal field of the laser (light source 3). $Si_3N_4$ and $SiO_2$ are also used to fabricate polarizer 6. For detector 4, Si is an excellent base material anyhow. By doping with Ge, the wavelength range of detector 4 is extended if necessary. Modulator 9 is fabricated, for example, from germanium which is diffused into or epitaxially grown on substrate 2, or from an Si-Ge mixed crystal.

Grooves 10 for holding coil ends 13, which may be V- or U-grooves, for example, are formed using conventional etching techniques. These techniques (e.g., anisotropic or chemical etching) can also be used to form a very closely toleranced mounting pit for receiving a commercially available laser diode such that no adjustment is required. The laser diode may also be epitaxially grown on substrate 2 in the form of multi-quantum-well layers of GaAlAs.

Figure 2:
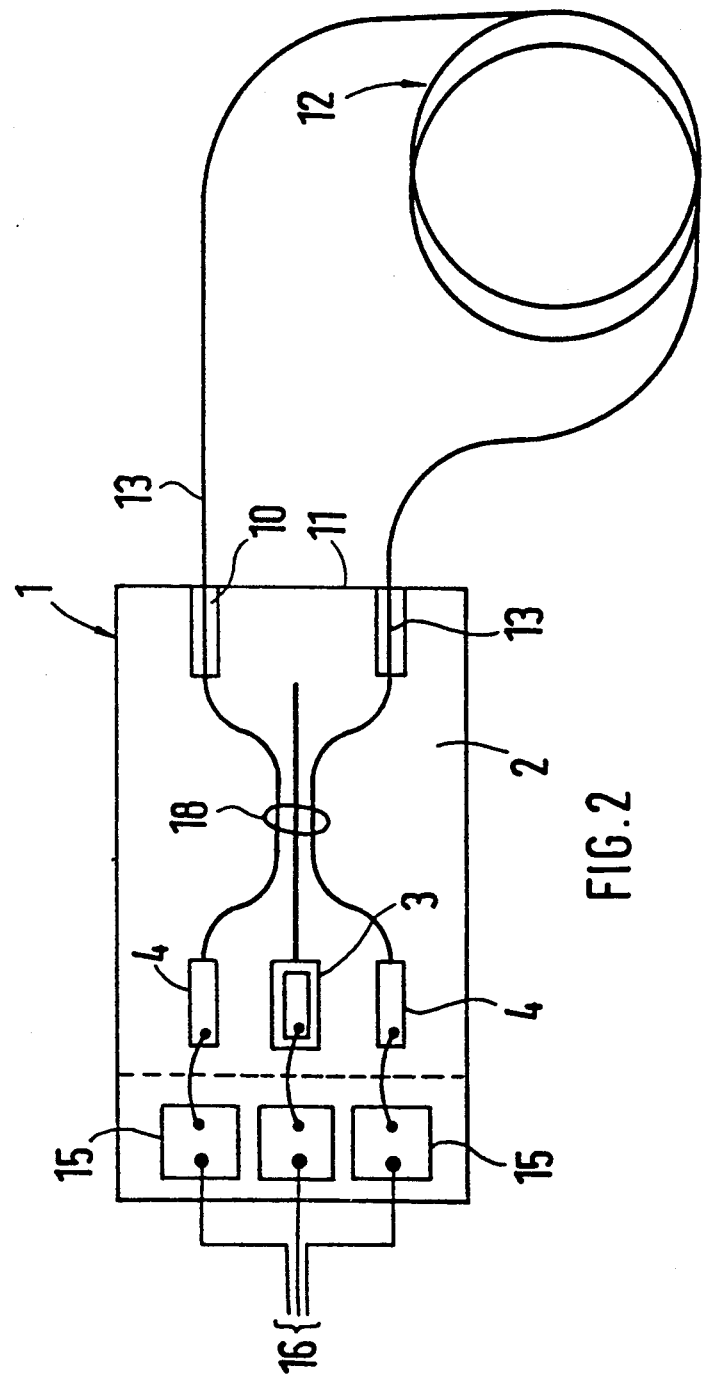
FIG. 2 shows schematically a second embodiment of a large-scale-integrated functional unit according to the invention having a fiber coil coupled thereto.

In large-scale-integrated functional unit 1 of FIG. 2, there is one detector 4 on each of two opposite sides of light source 3. Coupled to these three functional units are input arms of a 3×3 coupler 18. Of the output arms of the 3×3 coupler, the two outer ones end in groove 10 holds coil ends 13 in place. The center output arm of the coupler output is unconnected. If required, an additional detector for checking input power may be connected to this arm. Associated with light source 3 and the two detectors 4 on substrate 2 are areas 15 whose functions correspond to those of the areas 15 of FIG. 1.

Figure 3:
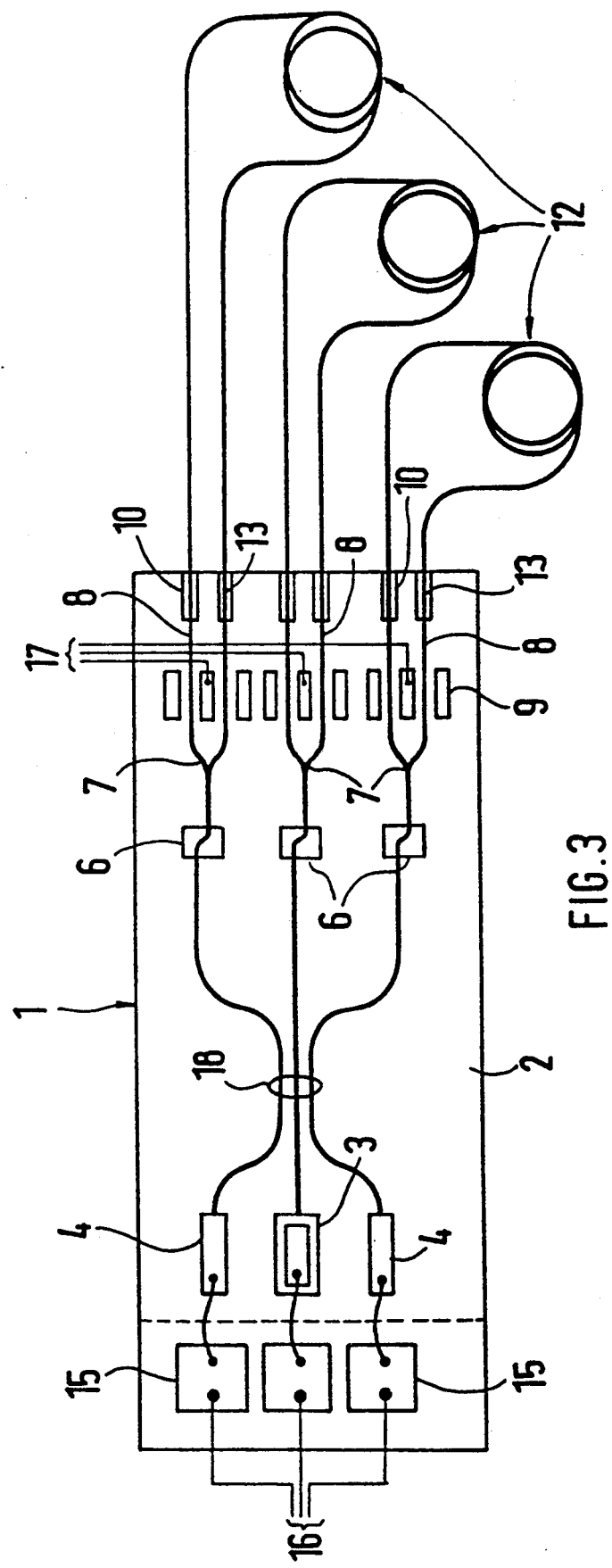
FIG. 3 shows schematically a third embodiment of a large-scale-integrated functional unit according to the invention having three fiber coils coupled thereto.

The large-scale-integrated functional unit 1 of FIG. 3 is similar in construction to that of FIG. 2. It differs from the unit of FIG. 2 in that each output arm of the 3×3 coupler 18 runs through a polarizer 6 and is then coupled to a beam splitter 7 with an Y-junction. Branches 8 of the Y-junction of each beam splitter 7 run through a modulator 9 and are then coupled to ends 13 of a fiber coil 12. Three fiber coils 12 can be coupled to such a large-scale-integrated functional unit 1. The fiber-optic gyro equipped therewith can thus measure absolute rotation rates in three different spatial directions if the axes of fiber coils 12 are mutually at right angles.

Figure 4:
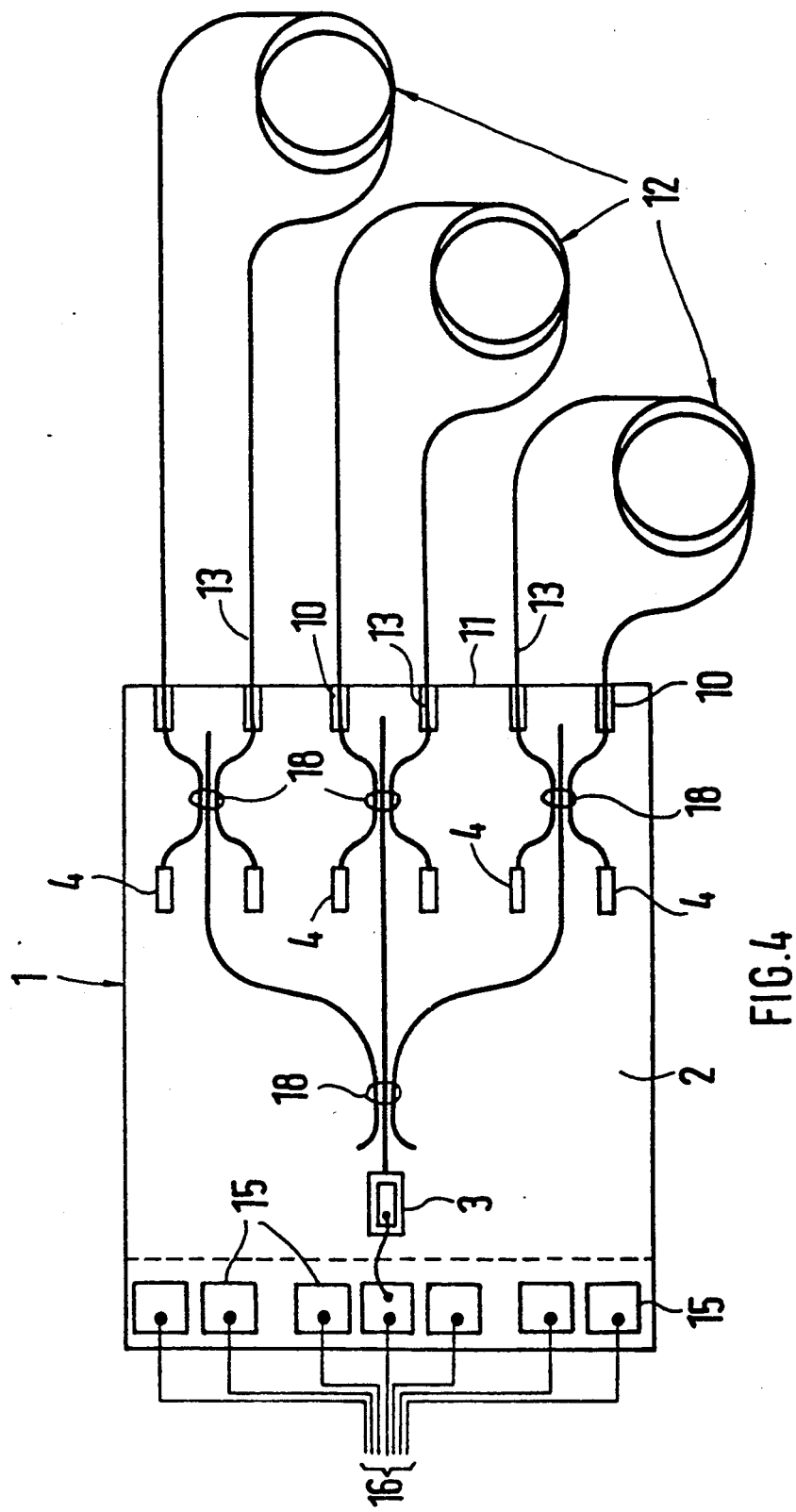
FIG. 4 shows schematically a fourth embodiment of a large-scale-integrated functional unit according to the invention having three fiber coils coupled thereto.

In the large-scale-integrated functional unit 1 of FIG. 4, a light source 3 is connected to the center arm of a 3×3 coupler 18, whose outer input arms are unconnected. The three output arms of coupler 18 are respectively connected to the center arms of three additional 3×3 couplers 18 which are arranged side by side. Each of the two outer input arms of each of the three additional 3×3 couplers 18 end in front of a detector 4, while the ends of the two outer arms form the interface for coupling three fiber coils 12 to unit 1. Ends 13 of these fiber coils 12 are again held in grooves 10 of substrate 2. The center output arms of the additional 3×3 couplers 18 are unconnected or may be coupled to detectors for checking input power.

It will be understood that the above description of the present invention is susceptible to various modifications, changes, and adaptations, and the same are intended to be comprehended within the meaning and range of equivalents of the appended claims.

I claim:

1. In a fiber-optic gyroscope for measuring rotation rates which includes electrical, optical, and electro-optical functional units and at least one fiber coil, the improvement wherein at least the optical and electro-optical functional units are integrated on a silicon substrate.

2. The improvement as claimed in claim 1, wherein a light source, at least one detector, and at least one 3×3 coupler interconnected via optical waveguides are integrated on the silicon substrate.

3. The improvement as claimed in claim 1, wherein a light source, at least one detector, at least one coupler, at least one polarizer, at least one beam splitter, and at least one modulator interconnected via optical waveguides are integrated on the silicon substrate.

4. The improvement as claimed in claim 2, wherein at least one of the electrical functional units is integrated on the silicon substrate.

5. The improvement as claimed in claim 1, wherein the silicon substrate has a mounting pit containing a hybrid integrated light source.

6. The improvement as claimed in claim 2, wherein the light source consists of epitaxial multi-quantum-well layers grown on the silicon substrate.

7. The improvement as claimed in claim 1, wherein at interfaces where said at least one fiber coil is coupled to the silicon substrate, the silicon substrate has two grooves per fiber coil for attaching ends of the coil.

8. In a fiber-optic gyroscope, a large-scale-integrated functional unit comprising:
a silicon substrate;
at least one light source formed on said substrate;
at least one detector formed on said substrate;
at least one optical coupling means formed on said substrate, for coupling said at least one detector and said at least one light source with at least one external fiber coil, ends of said at least one fiber coil being fixedly disposed in grooves in said substrate.

9. The improvement as claimed in claim 1, wherein at least passive functional units are composed of $SiO_2$ doped with one of phosphorous and germanium.

10. The improvement as claimed in claim 1, wherein at least passive functional units are composed of $Si_3N_4$.

11. The improvement as claimed in claim 2, wherein the at least one detector integrated on the silicon substrate is doped with germanium to broaden detector wavelength range.

12. The improvement as claimed in claim 2, wherein the light source integrated on the silicon substrate is composed of GaAlAs epitaxially grown in multi-quantum well layers.

13. The improvement as claimed in claim 3, wherein the at least one modulator is composed of germanium which is diffused into the silicon substrate.

14. The improvement as claimed in claim 3, wherein the at least one modulator is composed of germanium which is epitaxially grown on the silicon substrate.

15. The improvement as claimed in claim 3, wherein the at least one modulator is composed of a silicon germanium mixed crystal.

16. The large-scale-integrated functional unit as claimed in claim 8, wherein the at least one coupling means is composed of $SiO_2$ doped with one of phosphorous and germanium.

17. The large-scale-integrated functional unit as claimed in claim 8, wherein the at least one coupling means is composed of $Si_3N_4$.

18. The large-scale-integrated functional unit as claimed in claim 8, wherein the at least one detector formed on the silicon substrate is doped with germanium to broaden detector wavelength range.

19. The large-scale-integrated functional unit as claimed in claim 8, wherein the at least one light source formed on the silicon substrate is composed of GaAlAs epitaxially grown in multi-quantum well layers.

* * * * *

UNITED STATES PATENT AND TRADEMARK OFFICE
CERTIFICATE OF CORRECTION

PATENT NO. : 5,194,917
DATED : March 16th, 1993
INVENTOR(S) : Rolf REGENER

It is certified that error appears in the above-identified patent and that said Letters Patent is hereby corrected as shown below:

On the title page, Item [30]

Line 30, kindly change the priority no. from "4027024006" to --40 27 024 --.

Signed and Sealed this

Twenty-eighth Day of December, 1993

Attest:

BRUCE LEHMAN

Attesting Officer    Commissioner of Patents and Trademarks